United States Patent [19]
D'Sylva et al.

[11] Patent Number: 5,699,385
[45] Date of Patent: Dec. 16, 1997

[54] METHOD AND APPARATUS FOR LOCATING AND TRACKING A QPSK CARRIER

[75] Inventors: Mark J. D'Sylva; Steven Lawrence, both of Toronto; Robert Strother-Stewart, Ajax, all of Canada

[73] Assignee: Scientific-Atlanta, Inc., Norcross, Ga.

[21] Appl. No.: 427,660

[22] Filed: Apr. 21, 1995

Related U.S. Application Data

[63] Continuation of Ser. No. 160,839, Dec. 3, 1993, abandoned.

[51] Int. Cl.$^6$ ................................................. H04L 27/06
[52] U.S. Cl. ........................... 375/344; 375/326; 375/329; 455/164.1
[58] Field of Search ........................ 375/202, 329, 375/330, 326, 344, 332; 455/162.1, 164.1, 164.2, 167.1, 173.1, 182.2, 182.3

[56] References Cited

U.S. PATENT DOCUMENTS

| | | | |
|---|---|---|---|
| 3,737,787 | 6/1973 | Wolfram | 455/164.1 |
| 3,757,228 | 9/1973 | Klank | 455/164.1 |
| 4,123,716 | 10/1978 | Borg | 455/192.2 |
| 4,127,819 | 11/1978 | Keane | 455/192.1 |
| 4,281,412 | 7/1981 | Wissel et al. | 375/86 |
| 4,298,986 | 11/1981 | Hughes | 375/84 |
| 4,429,415 | 1/1984 | Chin et al. | 455/164.1 |
| 4,587,514 | 5/1986 | Schas et al. | 341/87 |
| 4,601,043 | 7/1986 | Hardt et al. | 375/1 |
| 4,652,903 | 3/1987 | Lucas | 348/489 |
| 4,697,277 | 9/1987 | van Rassal | 375/116 |
| 4,723,283 | 2/1988 | Nagasawa et al. | 380/20 |
| 4,742,543 | 5/1988 | Frederiksen | 380/9 |
| 4,763,357 | 8/1988 | Barr | 380/48 |
| 4,787,085 | 11/1988 | Suto et al. | 370/110.1 |
| 4,817,142 | 3/1989 | van Rassal | 380/15 |
| 4,829,569 | 5/1989 | Seth-Smith et al. | 380/10 |
| 4,866,770 | 9/1989 | Seth-Smith et al. | 380/20 |
| 4,879,728 | 11/1989 | Tarallo | 329/306 X |
| 4,890,321 | 12/1989 | Seth-Smith et al. | 380/20 |
| 4,965,809 | 10/1990 | Endo | 375/38 |
| 4,994,909 | 2/1991 | Graves et al. | 348/7 |
| 5,062,105 | 10/1991 | McKnight et al. | 370/84 |
| 5,091,936 | 2/1992 | Katznelson et al. | 380/19 |
| 5,121,409 | 6/1992 | Goss | 375/1 |
| 5,125,105 | 6/1992 | Kennedy et al. | 455/164.1 |
| 5,200,823 | 4/1993 | Yoneda et al. | 348/473 |
| 5,390,348 | 2/1995 | Magon et al. | 455/192.2 |

OTHER PUBLICATIONS

Requirements and Method for High–level Multiplexing of MPEG and Other Digital Service Bistreams With Universal Transport Layer; International Orginization For Standardization, Organisation Internationale De Normalisation; Nov. 1992; pp. 1–27.

*Primary Examiner*—T. Ghebretinsae
*Attorney, Agent, or Firm*—Banner & Witcoff, Ltd.

[57] ABSTRACT

In a receiver for receiving a carrier modulated with data, there is provided a system for locating and tracking said carrier. The carrier is located by sweeping a frequency range containing said carrier. False lockup are inherent when a wide frequency sweep demodulator attempts to lock onto a carrier, and the system recognizes such lockups by monitoring data from a Viterbi error correction circuit. On false lockup, the system breaks the lockup and continues the sweep until the true data carrier is located and tracked.

16 Claims, 10 Drawing Sheets

PHASE DIAGRAM OF MODULATED CARRIER

I DATA BIT STREAM

I MODULATED CARRIER

Q DATA BIT STREAM

Q MODULATED CARRIER

COMBINED QPSK CARRIER

| | I | 0 | 0 | I |
|---|---|---|---|---|
| I | | | | |
| Q | I | I | 0 | 0 |

METHOD AND APPARATUS FOR LOCATING AND TRACKING A QPSK CARRIER

This is a continuation of application No. 08/160,839, filed Dec. 3, 1993, now abandoned.

This application is related to the following applications: Ser. No. 161,159, filed Dec. 3, 1993, entitled "Multi-Service Data Receiver Architecture"; Ser. No. 161,160, filed Dec. 3, 1993, now U.S. Pat. No. 5,583,562, entitled "System and Method for Transmitting a Plurality of Digital Services Including Imaging Services", and Ser. No. 160,841, filed Dec. 3, 1993, now U.S. Pat. No. 5,420,640, entitled "Memory-Efficient Method and Apparatus for Sync Detection, all filed concurrently herewith.

I. BACKGROUND OF THE INVENTION

A. Field of the Invention

The present invention relates to digital signal transmission and reception, and more particularly, to a system for and method of locking onto and tracking a received QPSK carrier carrying a multiplexed data signal having a bandwidth on the order of that of a television signal.

B. Description of Related Art

The background of the present invention is described herein in the context of pay television systems, such as cable television and direct broadcast satellite (DBS) systems, that distribute a variety of program services to subscribers, but the invention is by no means limited thereto except as expressly set forth in the accompanying claims.

In the pay television industry, "programmers" produce programs for distribution to various remote locations. A "program" may consist of video, audio and other related services, such as closed-captioning and teletext services. A single programmer may wish to supply many programs and services. Typically, a programmer will supply these services via satellite to individual subscribers (i.e., DBS subscribers and/or cable television operators). In the case of cable television operators, the services transmitted via satellite are received at the operator's "cable head-end" installations. A cable operator typically receives programs and other services from many programmers and then selects the programs/services it wishes to distribute to its subscribers. In addition, a cable operator may insert locally produced services at the cable-head end. The selected services and locally produced services are then transmitted to the individual subscribers via a coaxial cable distribution network. In the case of DBS subscribers, each subscriber is capable of receiving a satellite down-link from the programmers directly.

In the past, pay television systems, including cable and DBS systems, have operated in the analog domain. Recently, however, the pay television industry has begun to move toward all digital systems where prior to transmission, all analog signals are converted to digital signals. Digital signal transmission offers the advantage that digital data can be processed at both the transmission and reception ends to improve picture quality. In addition, digital data compression techniques have been developed that achieve high signal compression ratios.

In copending U.S. application Ser. No. 07/968,846 filed Oct. 30, 1992 now U.S. Pat. No. 5,400,401 and entitled "System and Method for Transmitting a Plurality of Digital Services," there is described an encoder for generating a multiplexed data stream carrying services to remote locations via, for example, a satellite or a cable distribution network. The generated data stream comprises a continuous sequence of frames, each frame comprising two fields, and each field comprising a plurality of lines. A first group of lines of a field defines a transport layer and a second group of lines defines a service data region. A feature of the disclosed scheme is the ability to dynamically vary the multiplexed data stream from field to field. A further feature of the disclosed scheme is that the data transmission rate of the multiplexed data stream is related to the frequency of known analog video formats, i.e. frame, field and horizontal line rates.

In copending U.S. application Ser. No. 07/970,918 filed Nov. 2, 1992, now U.S. Pat. No. 5,319,307 entitled "System and Method for Multiplexing a Plurality of Digital Program Services for Transmission to Remote Locations," there is described another system, this for multiplexing a plurality of digital program services comprising a collection of, for example, video, audio, teletext, closed-captioning and "other data" services. According to the disclosed scheme, a plurality of subframe data streams are generated, each having a transport layer region and a program data region. These subframe data streams are then multiplexed together into superframes having a transport layer region and a subframe data region.

While these disclosed transmission systems permit a variety of services to be transmitted over various media to remote locations, there remains a need to provide yet other alternative arrangements more particularly adapted to the wide variety of services that may be offered over various media and permit the end user at the remote location greater flexibility over the data content the user is ultimately enabled to receive. Moreover, such a system should be able to be easily adapted to transmit an increasing number of different services in an increasingly efficient manner, for example, utilizing the same or less bandwidth.

Since such services as high definition color television services, so-called "surround-sound" digital audio services, interactive transactional services for home-shopping, reservations, first-run as well as classic movie programming, software delivery, interactive games, alarm services, energy management and such all involve different bandwidths, data formats and such, there remains a need for flexibility in the overall structure provided for transmitting such services. Moreover, a user should not be presented with an overwhelming number of choices, but should be able, in a user-friendly manner, to select only those services which he is capable of receiving or wants to receive. Ideally, the user should be able to have access to an infinite variety of data services, selectable as he chooses, so that he may, for example, watch a first run movie in so-called high definition format accompanied by a "surround-sound" audio in the language of his choice and, at the same time, receive a facsimile or voice communication over the same media. If the user is equipment-limited, for example, to a standard resolution television and a telephone set, the user should be able to fashion the delivery of services to the equipment he owns.

Digital data is usually modulated onto a carrier prior to transmission. Digital video or audio may be compressed prior to modulation by well known means, such as those in conformity to MPEG standards (ISO 11172 or 13818).

At the receiver, the data modulated onto the carrier must be demodulated. First, however, the receiver must be tuned to the carrier frequency where the data is located, the QPSK (quadrature phase shift keying) carrier in a preferred embodiment of the instant invention. The receiver must then track the QPSK carrier. This is because the QPSK carrier will inevitably suffer some drift because of limitations in the RF circuitry. Referring to FIG. 1, an apparatus is shown for tracking the QPSK carrier. Tuner 101 receives the RF television signal. Tuner 101 has an automatic frequency control (AFC) input for adjusting the tuning of tuner 101. The AFC is used to track the QPSK carrier. The output of tuner 101 is input to QPSK demodulator 102 and then digitized by A/D converter 103. Digital PAL Logic 104 then determines whether the receiver is tuned to the QPSK carrier. Digital PAL Logic 104 generates a phase error signal. The phase error signal is passed through the loop filter and sweep circuit 105 and then to the AFC input of the tuner 101, which adjusts the tuner 101 to track the QPSK carrier.

To acquire the carrier initially, the AFC of tuner 101 is swept by the Loop Filter and Sweep Circuit 105 to search for the carrier frequency. When a carrier is found, the system goes into the tracking mode described above.

In many digital data systems a wide sweep range, such as on the order of two megahertz and up, is required to find a desired carrier. This is because communications equipment, such as satellite dishes, often contains wide tolerance oscillators and other components with wide tolerances, so that the equipment is economical. Thus, the reception equipment must be able to compensate for these wide tolerances, and a wide sweep is required. Because of this wide sweep, false locks can occur. False locks occur when the demodulator thinks it is tracking a carrier, but in reality it is off frequency and the data recovered is invalid. This condition occurs at QPSK offset frequencies of multiples of ¼ the A/D converter sampling frequency or symbol clock. The problem is common to all QPSK demodulators that use wide sweep ranges.

Referring to FIGS. 2(a)–2(c), examples of true and false locks are shown. Consider a sampled QPSK demodulated data rate of 24.57 Mbits per second. A 24.57 Mbit per second demodulated data rate translates into a 49.14 Mbits per second total data rate since most satellite digital systems use two bit streams (I and Q) to transmit information. Potential false locks will occur in intervals of 3.07 MHz from the following calculation: 21.5 Mbits data×(8/7)=24.57 Mbits per second; 24.57/2×(90°/360°)=3.07 MHz. Note that in actuality, data in the proposed system described by the calculation is not sampled at 24.57 MHz but at 25.47/2 MHz because, in this system, the data carrier is modulated by two different data streams that are time-division multiplexed, either one of which may be used. The two data streams may represent, for example, two different channels in this proposed system. This is a example system only. If data was sampled at a full 24.57 MHz, the false locks would occur at approximately 6 MHz intervals. The (8/7) fraction takes into account the error correction coding added to the actual data to be transmitted. FIG. 2(a) shows the sweep of the tuner AFC for an input IF of 479.5 MHz. The true lock occurs in the center of the sweep with potential false locks occurring at each end of the sweep. FIG. 2(b) show the sweep of the tuner AFC for an input IF of 482.5 MHz. The true lock occurs near the beginning of the sweep, with potential false locks occurring in the center and near the end of the sweep. Finally, FIG. 2(c) shows the sweep of the tuner AFC for an input IF of 476.5 MHz. The true lock occurs near the end of the sweep, with potential false locks occurring near the beginning and at the center of the sweep. Of course, the data rate of 24.57 Mbits per second is for example only. Other data rates will result in other lockup points.

Several solutions to this problem of false locking have been suggested. It has been suggested that the sweep range be limited, in effect, requiting that all RF frequencies be kept to a high stability. However, this stability could be provided only by expensive RF hardware.

It has also been suggested that the output signals from the demodulator be compared for phase shift difference. A false lock would produce a different level of phase shift than a true lock. A level circuit would then restart the sweep of the tuner AFC if a false lock was detected. This would require more expensive equipment and be less flexible than a microprocessor controlled approach, given that a microprocessor and error correctors are already present in most digital transmission and reception systems.

Finally, it has been suggested that double sampling be performed at the A/D converter while using faster digital PAL logic. This technique would allow sweeps without false locks. However, it would require more expensive logic and a faster A/D converter and symbol clock, all of which adds to the expense of the system.

SUMMARY OF THE INVENTION

This invention is a method to sweep for acquisition of a QPSK carrier while avoiding false lock conditions and an apparatus for performing the method. By using elements already present in most digital receivers, false locks are eliminated with only a small additional cost.

In a preferred embodiment, a Viterbi error correction chip is used in connection with a microprocessor to control a sweep circuit and loop filter to locate and track a QPSK carrier. The Viterbi chip and microprocessor are frequently present in digital signal receivers as described in more detail in application Ser. No. 08/160,841, filed Dec. 3, 1993.

DETAILED DESCRIPTION OF THE DRAWINGS

Figure 3:
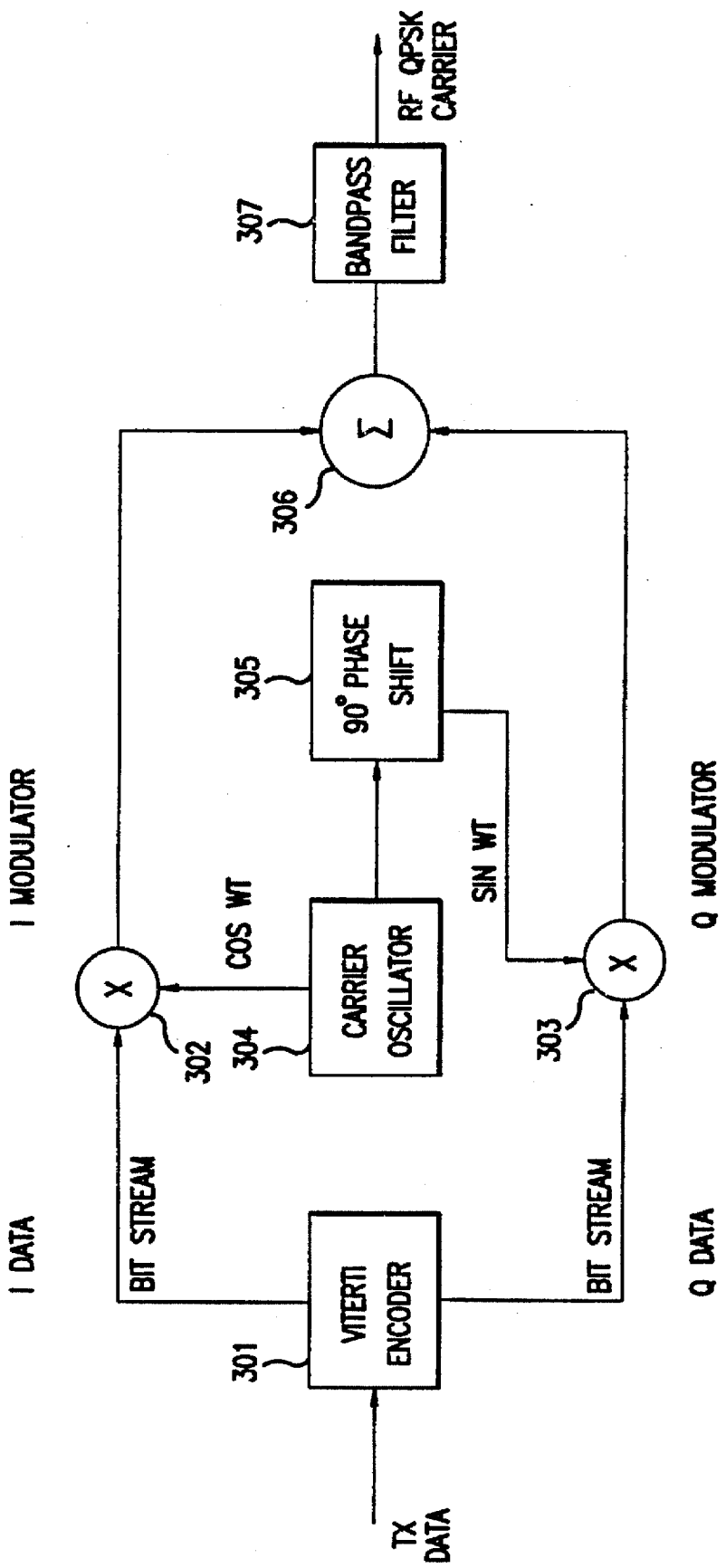
FIG. 3 is a block diagram of a modulator system in accordance with the instant invention.

FIG. 3 shows a block diagram of a preferred embodiment of a modulation system in accordance with the invention. Since an RF carrier must be used to transmit the data in a wireless fashion, an efficient method must be used to modulate the data on the RF carrier. The method used in the preferred embodiment is known as phase shift keying or PSK. The phase of the RF carrier is, for example 0° for digital "ones" and 180° for digital "zeros". However, to double the data transmission rate and still conserve transmission bandwidth, two data streams known as the I and Q bit streams each PSK modulate the RF carrier. The I bit stream modulates the RF carrier at 0° phase (cos ω) and the Q bit stream modulates the RF carrier at 90° phase (sin ω) This generates an I modulated and Q modulated carrier. Summing these together produces a QPSK modulated carrier or Quadratrue Phase Shift Keying modulated carrier.

Referring to FIG. 3, data to be transmitted (TX Data) enters Viterbi encoder 301 and is forward error encoded (FEC) by Viterbi encoder 301 and split into I and Q bit streams. The RF carrier is provided by a RF carrier oscillator 304, which provide two sinewave outputs, cos ωt directly from carrier oscillator 304 and sin ωt from 90° phase shift element 305. I and Q carriers are generated by I modulator 302 and Q modulator 303. The signals are added in adder 306 and filtered by bandpass filter 307. The output of bandpass filter 307 is a QPSK modulated carrier.

Figure 4:
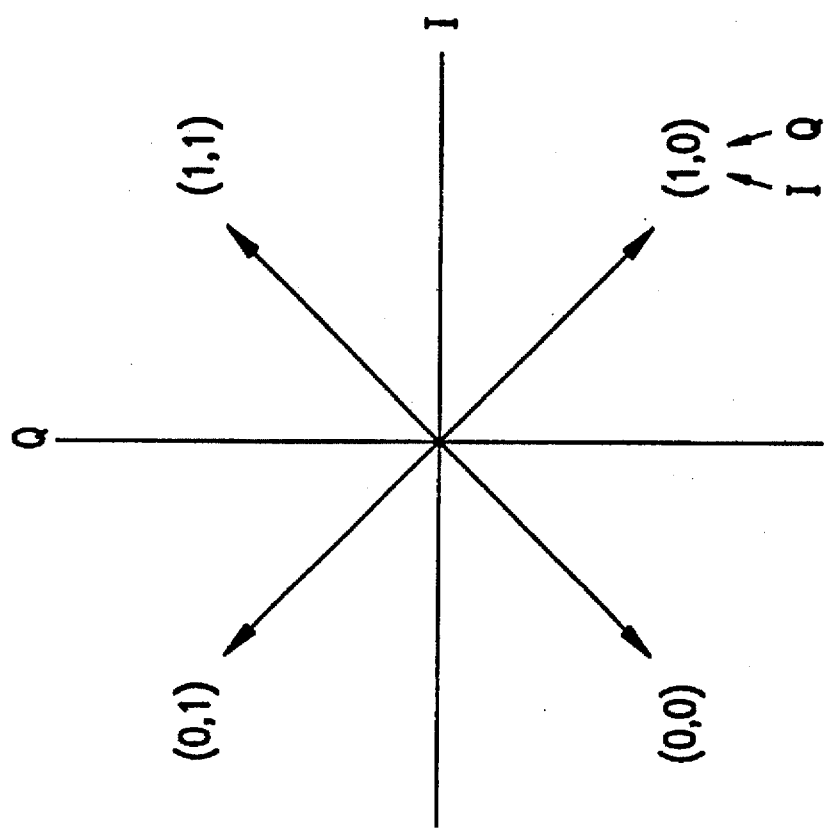
FIG. 4 is a phase diagram illustrating the modulation technique of the present invention.

The phase of the RF carrier is dependent on the instantaneous phases of both the I and Q carriers; a phase diagram is shown as FIG. 4. As can be seen, each combination of I and Q data bits produces a unique phase of the QPSK carrier. For example if both I and Q are 1 then the carrier is 45°. If both I and Q are 0 then the carrier is 225°. If I is 1 and Q is 0, then the carrier is 315°. Finally, if I is 0 and Q is 1, the carrier is 135°.

Figure 5:
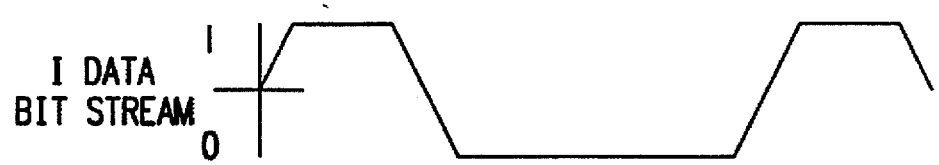
FIG. 5 contains graphs illustrating the modulation technique of the present invention.
Figure 5:
Figure 5:
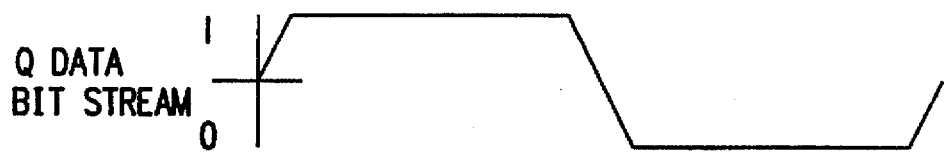
Figure 5:
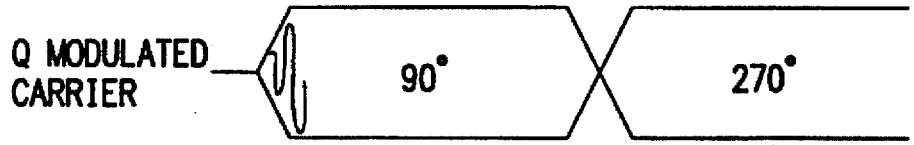
Figure 5:
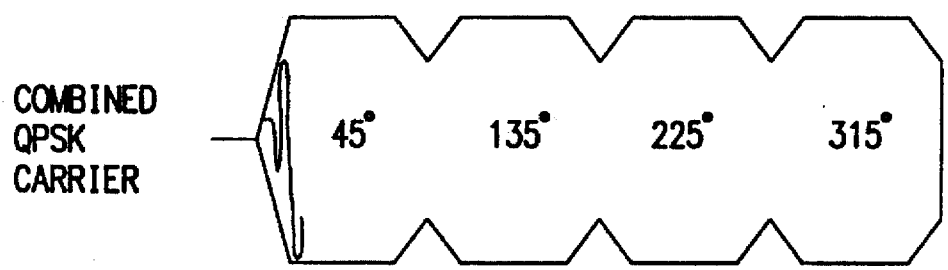

FIG. 5 shows the relationship between the I and Q data bit streams and the corresponding phases of the corresponding modulated carriers. This figure shows the possible states of the I and Q data bit streams versus all four phase positions of the RF QPSK carrier, 45°, 135°, 225° and 315°.

Figure 1:
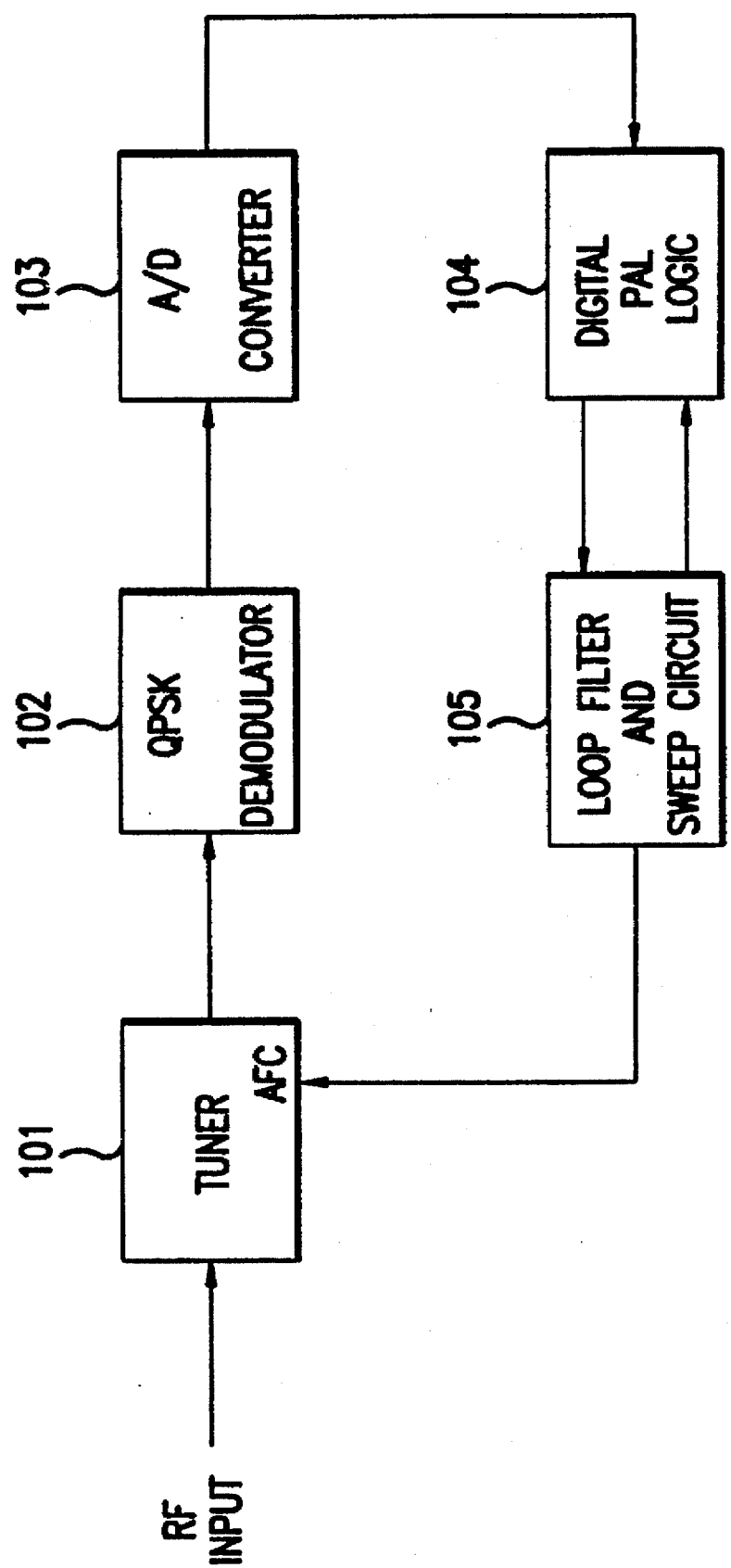
FIG. 1 is a block diagram of a carrier locating and tracking system in accordance with the prior art.
Figure 6:
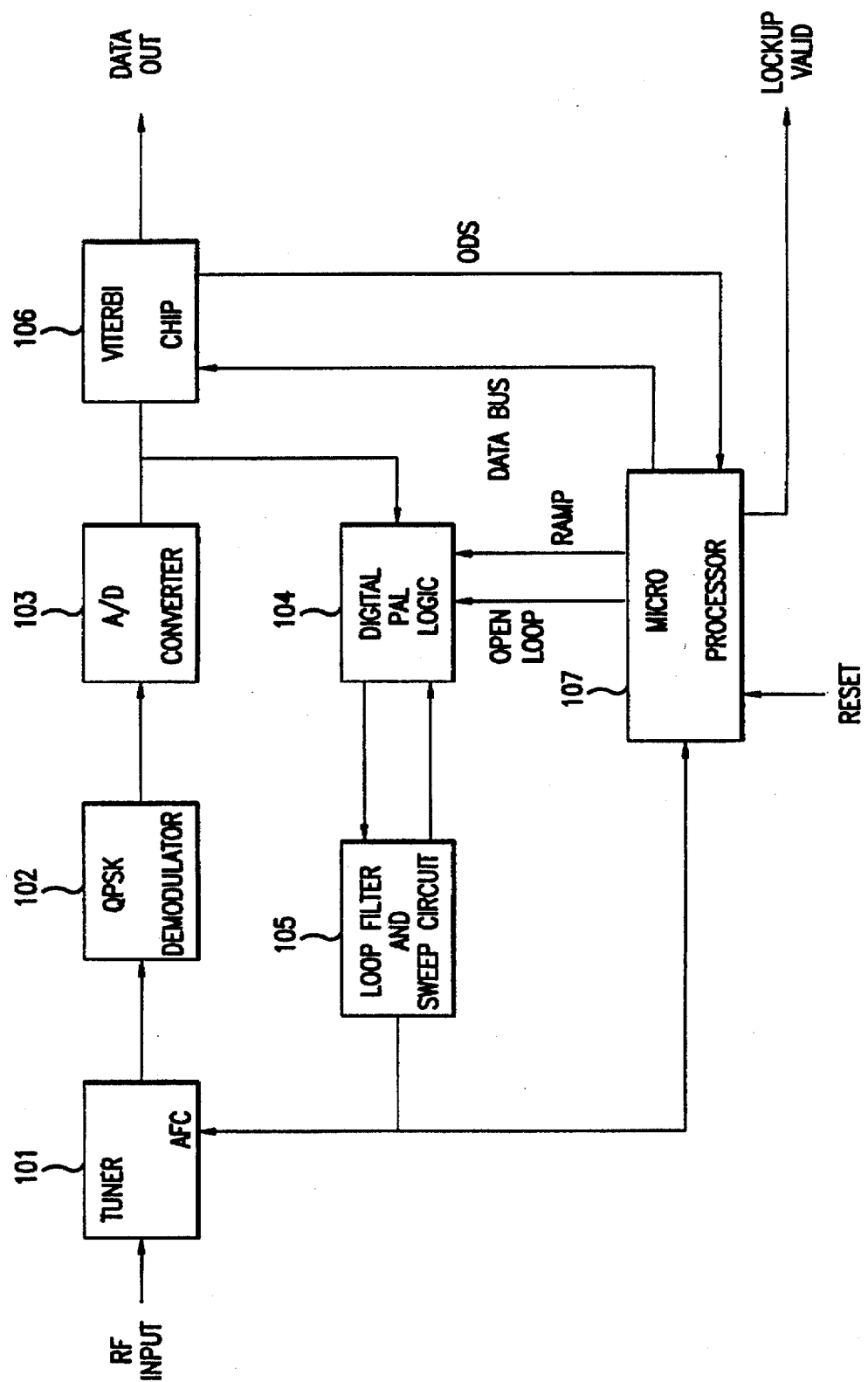
FIG. 6 is a block diagram of a carrier locating and tracking system in accordance with the instant invention.

FIG. 6 shows the carrier tracking and lockup system of the present invention. Tuner 101, QPSK demodulator 102, A/D converter 103, digital PAL logic 104 and loop filter and sweep circuit 105 are the same as shown and described in regard to FIG. 1. In addition, FIG. 6 shows a Viterbi chip 106 and microprocessor 107. The Viterbi chip may be of a standard type generally available from vendors, such as Standard Telecom. Furthermore, the invention is not limited to Viterbi error correction techniques. Any error correction technique that establishes a threshold for error and then determines whether that threshold has been exceeded or not may be used. As an example, Reed Solomon coding could be used for error detection.

Microprocessor 107 initiates the carrier locating process by initializing the Viterbi chip 106, setting its error threshold factor, which, in effect, set the tolerance for error in the system. The microprocessor 107 then instructs the digital PAL logic to close the loop and sweep the tuner AFC using the "Ramp" signal from the Microprocessor 107 to the digital PAL logic 104. Microprocessor 107 monitors the Viterbi out-of-sync ("OOS") output looking for a low error rate, indicating a true signal acquisition. Microprocessor 107 also monitors the tuner AFC voltage sweep. If the voltage sweep stops, indicating a lock, and the OOS signal error rate has not dropped, then the microprocessor has detected a false lock. The microprocessor then briefly opens the loop by pulsing the "Open Loop" line between microprocessor 107 and digital PAL logic 104 and continues the sweep. When the voltage sweep stops and the OOS error rate is low, then a true lock has been established.

Figure 7:
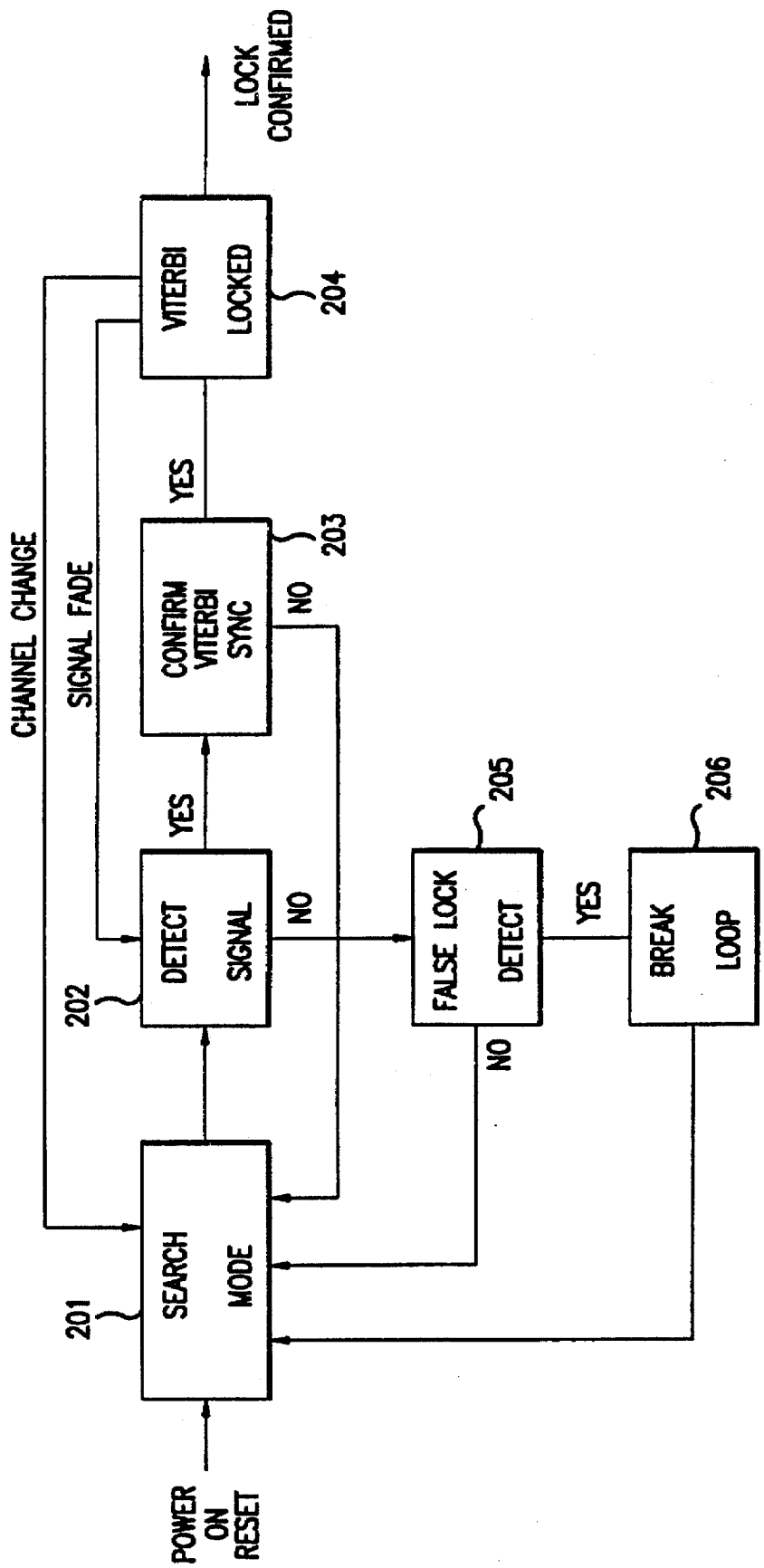
FIG. 7 is a block diagram of a process of locating and tracking a carrier in accordance with the instant invention.

Referring now to FIG. 7, the software lockup sequence is shown. At Power On Reset, the receiver enters search mode 201 and begins sweeping the tuner AFC, searching for the QPSK carrier. The receiver then looks for a low OOS signal in detect signal step 202. If a low OOS signal is not detected, then no valid signal has been detected. If no valid data is detected, then the system checks for a false lock in false lock detect step 205. In step 205, the system determines if the AFC voltage is remaining constant. If so, lockup has occurred and the lockup must be false since OOS has not dropped. Accordingly, the loop is broken in the break loop step 206. The loop is held open for approximately 20 ms to break the loop. The system then re-enters the search mode. The process continues until the system locks on the "true" QPSK carrier as indicated by the OOS output going low.

When the OOS goes low, the system is likely locked on the true QPSK carrier. A "yes" signal is output from detect step 202. The confirm Viterbi sync step 203 then confirms that the system has locked on the true signal. The true lock is confirmed by instituting a short delay where OOS is ignored. OOS is ignored here because during the initial stages of a true lock OOS may oscillate. After the delay has expired, another delay follows, but this time transitions of OOS are counted. If the number of transitions is less than a predetermined threshold, lock is confirmed. If the number of transitions is more than the predetermined threshold, the system determines in step 203 that true lockup has not been established and control passes to step 201, the search step. If true lockup is confirmed in step 203, the Viterbi locked step 204 outputs a "lock confirmed" signal.

Figure 8:
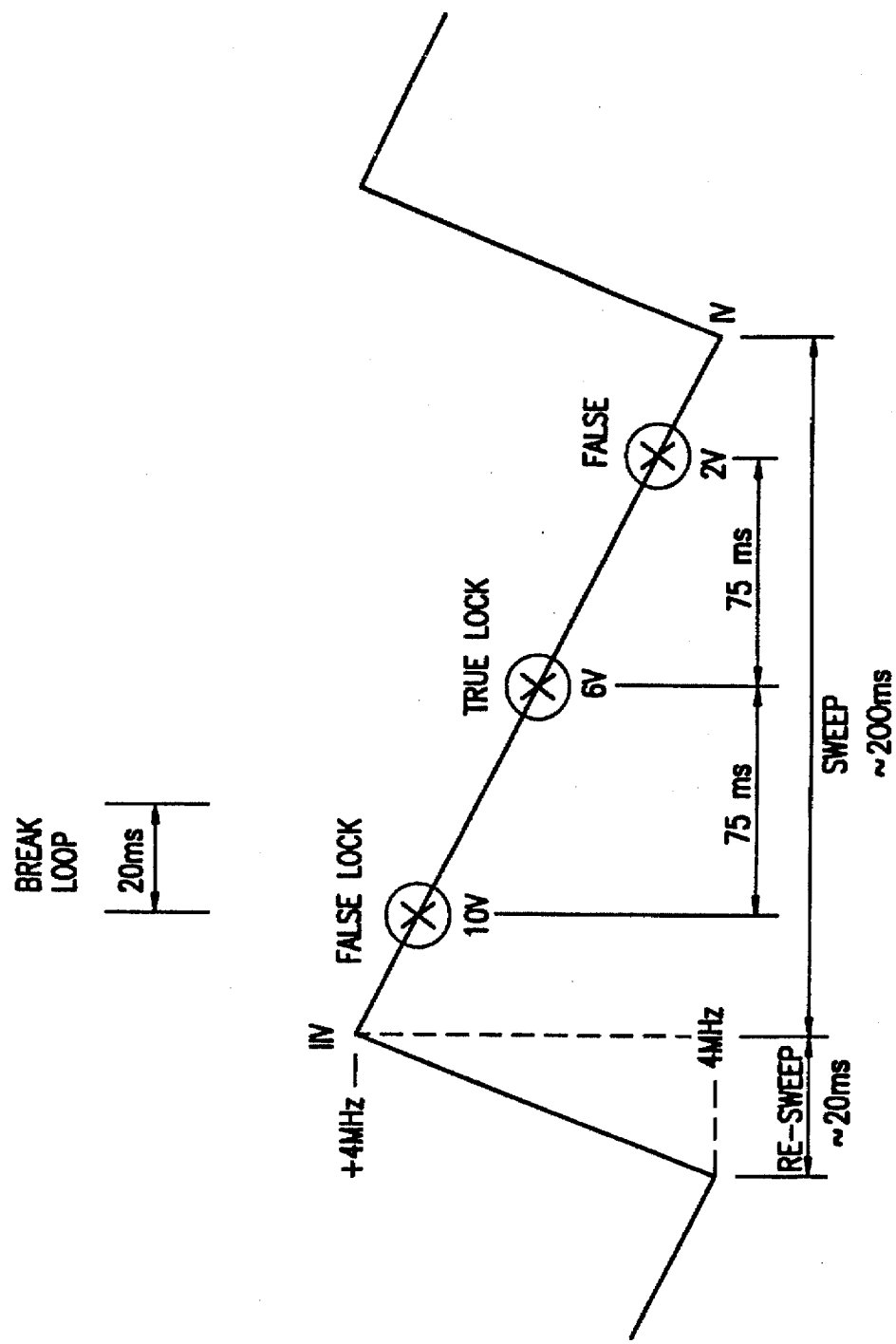
FIG. 8 shows a example voltage sweep in accordance with the instant invention.

Consider the sweep shown in FIG. 8, where the tuner AFC is swept between 11V and 1V. This is the sweep used for locating the QPSK carrier in a preferred embodiment. This sweep is only exemplary and other sweeps can be used and fall within the scope of the present invention. The sweep begins at 11V and sweeps down to 1V. In this embodiment, and for example only, true lockup occurs at 6V, with potential false lockups occurring at 10V and 2V. The sweep takes 200 ms to complete in the preferred embodiment. Potential lockups occur at 75 ms on each side of the true lockup point in this embodiment. At the end of the sweep, a swift re-sweep occurs bringing the sweep voltage back to 11V in the preferred embodiment.

Figure 2A:
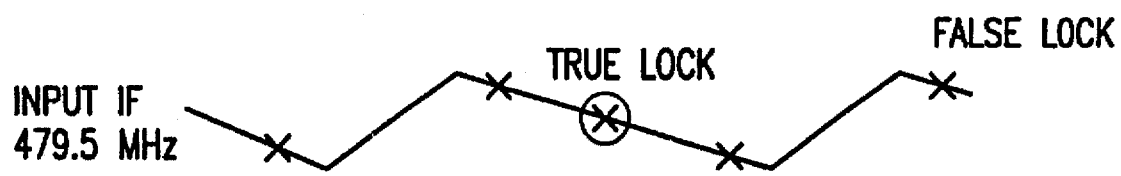
FIGS. 2(a)–2(c) are graphs showing true and false lock points in sample AFC sweeps.
Figure 2B:
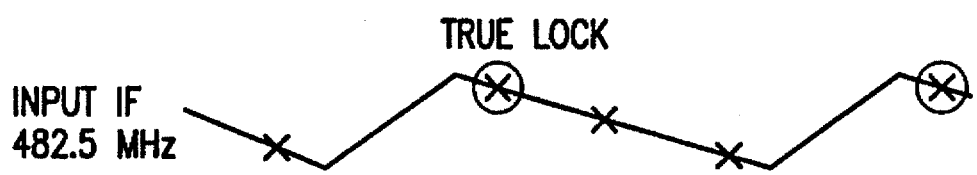
Figure 2C:
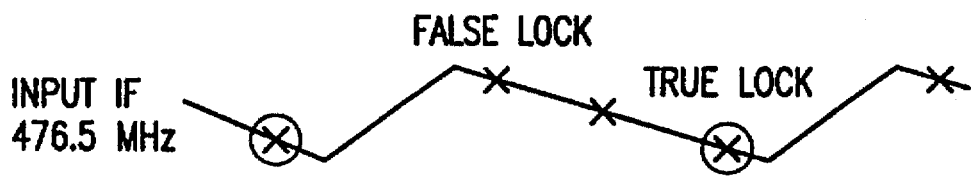
Figure 9:
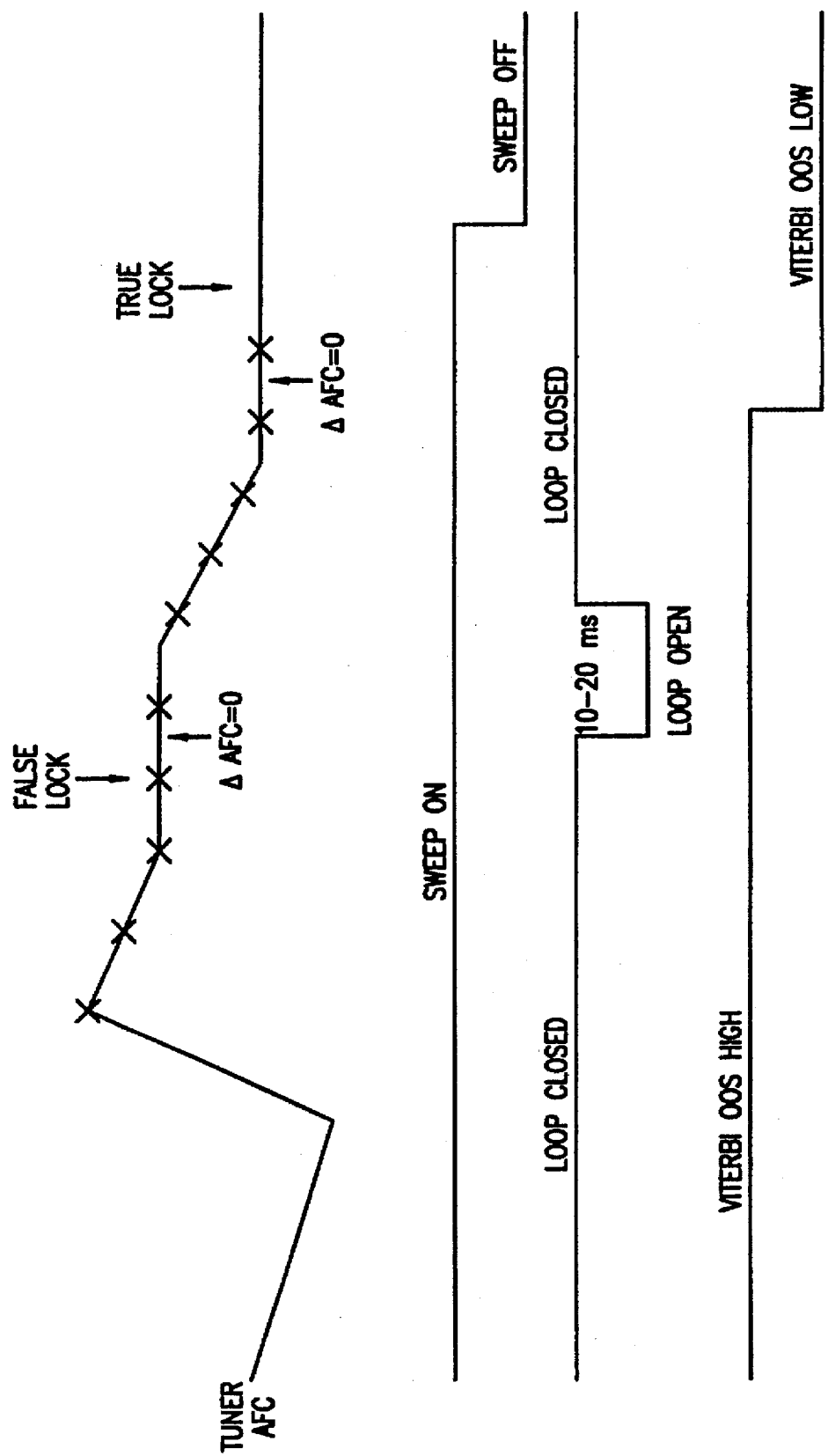
FIG. 9 shows a timing diagram for the system of FIG. 6.

Now referring to FIG. 9, a timing diagram for the system of FIG. 6 is shown. The sweep is exemplary only and the sweep will vary depending on the frequencies chosen as shown in FIGS. 2(a)–2(c). The top line indicates the tuner AFC voltage. The second line indicates whether the voltage sweep is occurring. The third line indicates whether the tracking loop is open or closed. Finally, the fourth line indicates whether the Viterbi OOS output is high or low, indicating invalid or valid data, respectively.

As the sweep drops the tuner AFC from its peak, a lock condition will occur. That is, the circuit of FIG. 6 will perceive a lockup as the tuner AFC will remain constant (ΔAFC=0). However, the microprocessor 107 (FIG. 6) and Viterbi chip 106 (FIG. 6), using the process shown in FIG. 7, will recognize that invalid data is being recovered (OOS is high). The microprocessor 107 will break the loop. Referring again to FIG. 8, a 20 ms break in the loop is shown. This ends the lockup condition. The sweep continues until the next lock point is reached (ΔAFC=0). The system then enters another lockup. But this time the circuit of FIG. 6, using the process of FIG. 7, determines that true data is present. The Viterbi OOS signal has dropped low. Therefore, the lockup is allowed to persist and the sweep is discontinued. Data recovery from the QPSK carrier can then proceed.

Figure 10:
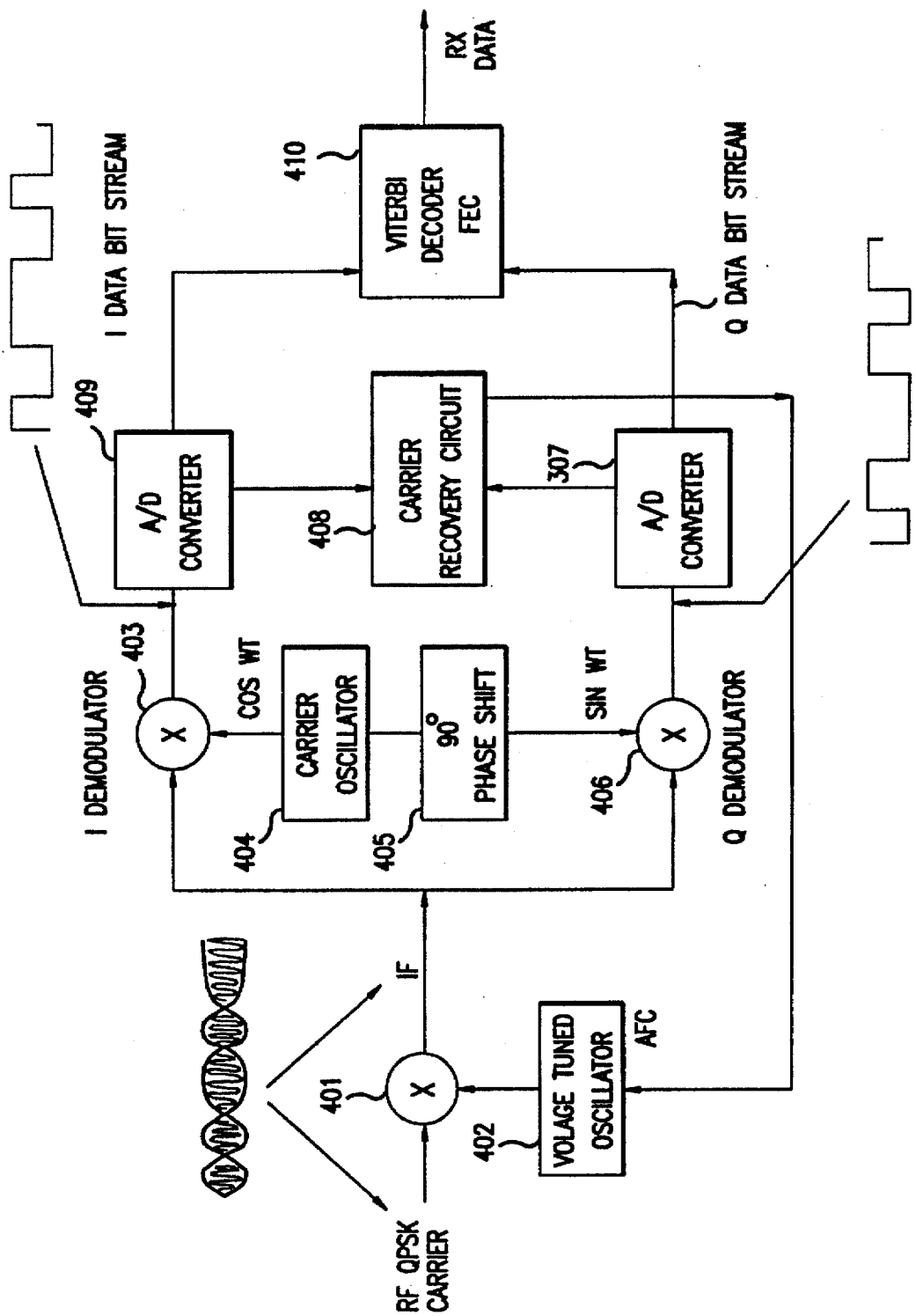
FIG. 10 is a more detailed block diagram of a QPSK demodulator in accordance with the instant invention.

Referring now to FIG. 10, a more detailed block diagram of a QPSK demodulator is shown. The RF QPSK carrier is selected by a tuning circuit (not shown) and enters on the left. A voltage tuned oscillator 402 mixes the RF signal frequency down to an IF frequency in mixer 401. The carrier oscillator 404 outputs a signal which mixes the QPSK modulated IF carrier to demodulate it by a synchronous detection method, thereby recovering the original I and Q data bit streams. This process occurs in demodulators 403 and 406, with demodulator 406 receiving input from 90° phase shift 405. However, in order to achieve the required synchronous detection it is required that the AFC input to the voltage tuned oscillator be such as to adjust the oscillator frequency to shift the QPSK modulated IF carrier to the exact frequency and phase of the output of carrier oscillator 404. This reverses the process that occurs in the modulator. The carrier recovery circuit 408 provides the AFC voltage to the voltage tuned oscillator 402. I and Q data streams enter the Viterbi decoder 410 and it recovers the receiver data (RX Data) in the reverse fashion of the Viterbi encoder.

The present invention has been described in the context of a satellite television system, but it is also applicable to QPSK multiplexed data transmitted via cable or modulated via optical fiber. The recovery techniques of the present invention could be used with these transmission media, but different conditions would be causing the false locks.

While the invention has been described in detail with reference to the appended drawings, the invention is limited in scope only by the claims. Moreover, any application cited herein should be construed to be incorporated by reference as to any subject matter deemed essential to the present disclosure.

We claim:

1. A receiver for receiving a data carrier having data modulated on it, said receiver comprising:

a tuner for tuning a range of frequencies, said range containing the frequency of the data carrier;

a signal tracking circuit for locating a signal within said frequency range having characteristics in common with said data carrier and tracking said signal by controlling said tuner, said signal tracking circuit outputting a lock signal when tracking a signal;

a demodulator for demodulating data on said signal being tracked by said signal tracking circuit;

an error detector for detecting errors in said demodulated data and outputting an error signal if an error rate in said demodulated data is above a predetermined threshold; and a resetting circuit for resetting said signal tracking circuit if said signal tracking circuit is outputting the lock signal and said error detector is outputting the error signal.

2. A receiver according to claim 1, wherein said data carrier is a quadrature phase shift keying modulated data carrier.

3. A receiver according to claim 1, wherein signal tracking circuit comprises a sweep circuit for sweeping the tuned frequency range of said tuner and a logic circuit for controlling said sweep circuit.

4. A receiver according to claim 1, wherein said error detector comprises a Viterbi error detector and a microprocessor.

5. A receiver according to claim 4, said tuner being located on a first chip and said Viterbi error detector being located on a second chip.

6. A receiver according to claim 3, wherein said sweep circuit comprises a sweep generating circuit.

7. A receiver according to claim 3, wherein said logic circuit comprises a digital PAL logic circuit.

8. A receiver according to claim 3, wherein said signal tracking circuit further includes a loop filter.

9. A receiver according to claim 4, said microprocessor controlling said Viterbi error detector and said signal tracking circuit.

10. A receiver according to claim 1, said receiver including an analog-to-digital converter with an oversampling ratio of at least 2, said analog-to-digital converter connecting said demodulator to said error detector, wherein said analog-to-digital converter converts said demodulated data from an analog form to a digital form.

11. A method of recovering data from a carrier modulated with said data, comprising:

sweeping a frequency range, said frequency range including the frequency of said data carrier;

locating a signal within said frequency range having characteristics in common with said data carrier;

tracking said signal having characteristics in common with said data carrier;

demodulating data on said signal being tracked by said tracking step;

detecting errors in said data demodulated in said demodulating step and outputting an error signal indicating an error rate in said demodulated data; and continuing to sweep said frequency range if said error rate is above a predetermined threshold.

12. A method of recovering data from a carrier according to claim 11, wherein said data carrier is a quadrature phase shift keying modulated data carrier.

13. A method of recovering data from a carrier according to claim 11, wherein said tracking step includes sweeping said frequency range and controlling said sweeping.

14. A method of recovering data from a carrier according to claim 11, wherein said detecting errors step includes detecting errors through a Viterbi error detection algorithm.

15. A method for recovering data from a carrier according to claim 11, said method including converting said demodulated data from an analog form to a digital form, said converting step converting with an oversampling ratio of at least 2.

16. A receiver for receiving a true data carrier having data modulated on it and at least one false carrier having data modulated on it, said true data carrier and said at least one false carrier being related by a fraction of the frequency of said true data carrier, said receiver comprising:

a tuner for tuning a range of frequencies, said range containing the frequency of said true data carrier;

a signal tracking circuit for locating a signal within said frequency range having characteristics in common with said true data carrier and tracking said signal by controlling said tuner, said signal tracking circuit outputting a lock signal when tracking said signal;

an error detector for detecting whether said signal being tracked is said at least one false carrier and outputting an error signal if said signal being tracked is said at least one false carrier; and a resetting circuit for resetting said signal tracking circuit if said signal tracking circuit is outputting said lock signal and said error detector is outputting said error signal.

* * * * *